Sept. 20, 1960 R. S. COFFMAN 2,953,279
SAFETY PRESSURE RELIEF DEVICE
Filed Sept. 10, 1954 2 Sheets-Sheet 1

INVENTOR.
Robert S. Coffman.
BY
ATTORNEY

Sept. 20, 1960 R. S. COFFMAN 2,953,279
SAFETY PRESSURE RELIEF DEVICE
Filed Sept. 10, 1954 2 Sheets-Sheet 2
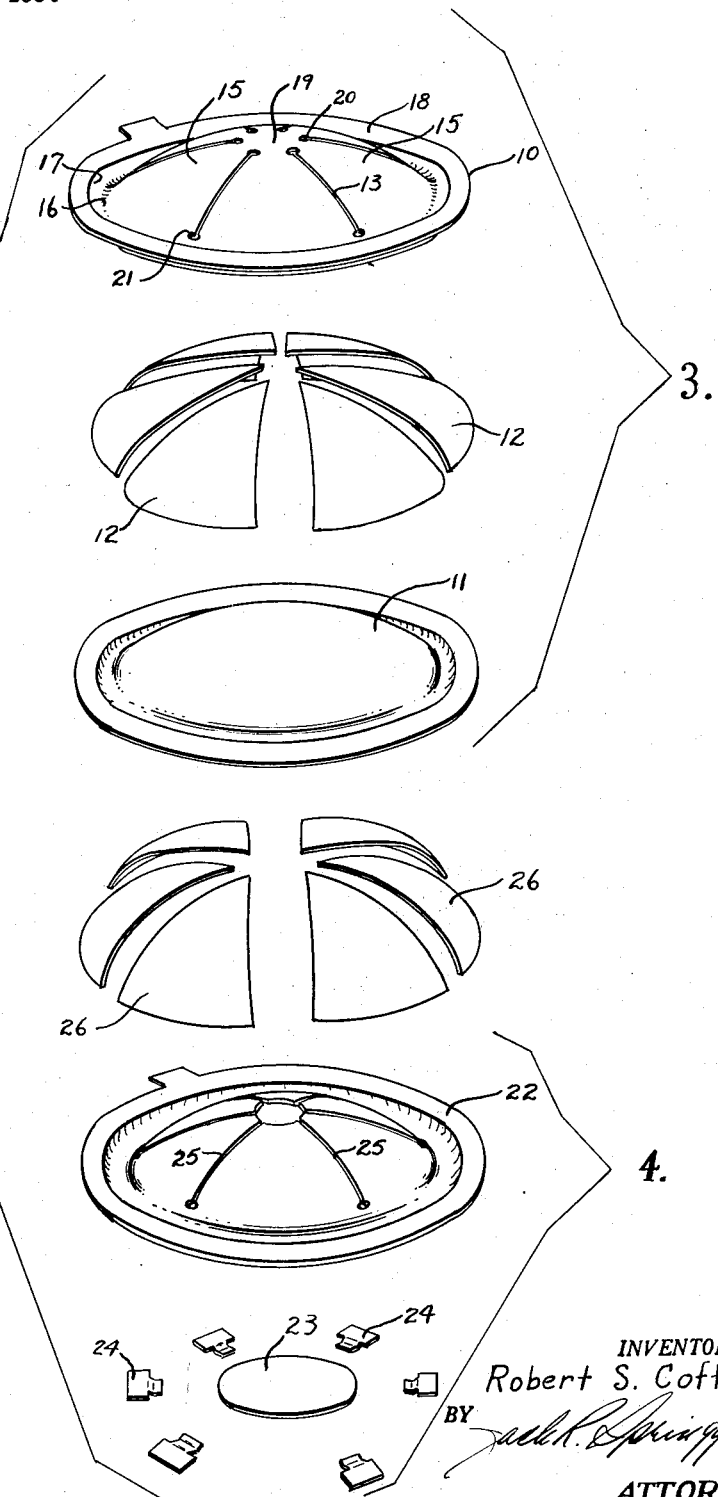
INVENTOR.
Robert S. Coffman
BY
ATTORNEY United States Patent Office 2,953,279
Patented Sept. 20, 1960

2,953,279

SAFETY PRESSURE RELIEF DEVICE

Robert S. Coffman, Kansas City, Mo., assignor to Black, Sivalls & Bryson, Inc., Kansas City, Mo., a corporation of Delaware Filed Sept. 10, 1954, Ser. No. 455,333

9 Claims. (Cl. 220—89)

This invention relates to safety pressure relief devices used to protect pressure vessels. More particularly, the present invention relates to safety pressure devices of the rupturable disc type suited to elevated temperatures, fluctuating pressures and corrosive conditions.

Previous safety pressure devices of the rupturable disc type have not operated entirely satisfactorily under the aforementioned extreme conditions. Their operating life under these conditions has been limited, particularly where there is a combination of two or all of the conditions. The limited life of this type of unit under elevated temperatures is believed to be due to creep failure. The term elevated temperatures for the purposes of this description means temperatures at which the metal of the disc under the predetermined stress would creep appreciably and ultimately fail within a period of time of one month or less. The limited life of this type of unit under fluctuating pressures is believed to be due to notch failure. Generally, this type of failure occurs in rupture discs when they are exposed to alternating internal and external pressure differentials. What actually happens to the disc is that an internal excess pressure differential tends to increase the crown height and move the central portion of the disc away from the vacuum support which is often supplied to prevent distortion of the disc when pressure within the vessel falls below that on the outside. With this central portion of the disc moved out of contact with the vacuum support the disc will be forced back onto the support when an external excess pressure differential is imposed on the unit. This reversing of the disc will cause wrinkles to be formed which will develop into notch failure. Thus within a relatively short period of time (for example one month or less) sufficient fluctuations may be imposed on the disc to cause notch or kinking failure. Obviously, the presence of corrosive conditions either in combination with one or both of the above mentioned conditions or by itself will tend to decrease the operating life of the unit appreciably.

Another disadvantage to previous rupturable disc safety pressure relief devices is that they inherently have a time lag between the time when bursting pressure is reached and the time when the disc ruptures. The reason for this time lag is that to rupture the disc has to be stressed beyond the yield point. Thus, even though the ultimate strength of the disc has been reached, the disc will yield before rupture, causing a lapse of time which may allow additional pressure increases.

The primary object of this invention is to provide a safety pressure relief device which will give increased operating life under conditions of elevated temperatures as previously described, fluctuating pressure differentials and corrosion. Another important object of this invention is to provide a safety pressure relief device which will withstand separately, or any combinations of, elevated temperatures, fluctuating pressures and corrosion, without appreciably affecting the bursting pressure of the device. Another object of the present invention is to provide a dome-shaped safety pressure relief device having slots radiating from a solid central portion for which the rupture pressure may be predetermined. A still further object of the present invention is to provide a safety pressure relief device structure composed of two members, one determining the rupture pressure and the other sealing the structure when installed in a relief area of a pressure vessel. A further object of the present invention is to provide a safety pressure relief device composed of two members, one determining the rupture pressure and the other protecting the first member from corrosive conditions and sealing the structure when installed in a relief area of a pressure vessel.

Another object of the present invention is to provide a safety pressure relief device which will not appreciably increase in crown height under conditions of elevated temperature, fluctuating pressure and corrosion, but will remain in position on its vacuum support at all times until the rupture pressure of the device is exceeded.

Another object of the present invention is to provide a safety pressure relief device which will rupture, giving pressure relief immediately, when the predetermined bursting pressure in the vessel or system is reached. A still further object of the present invention is to provide a safety pressure relief device which will rupture at its original crown height when the predetermined bursting pressure is reached.

In accomplishing these and other objects of the invention, I have provided improved details of structure, the preferred form of which is illustrated in the accompanying drawing wherein:

Fig. 4 is a view illustrating the components of the present invention in spaced relationship.

Figure 1:
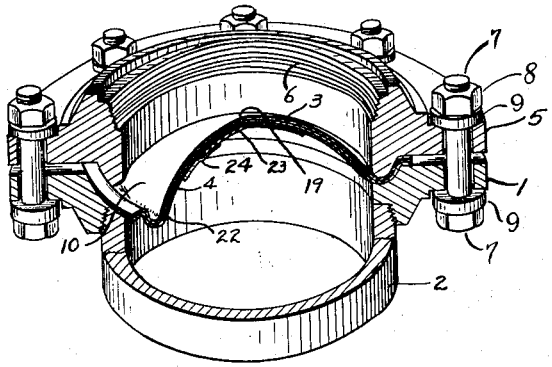
Fig. 1 is a partially sectioned perspective view of a device embodying the principles of the present invention.

The device as shown in Fig. 1 embodies a preferred form of the present invention. A base flange 1 is threaded or otherwise suitably connected to a pipe or tubular member 2 which serves as the relieving outlet for the pressure vessel to be protected. The safety pressure relief device 3 and the vacuum support 4 are installed between the base flange 1 and a holddown flange 5. The holddown flange 5 is generally provided with threads as shown at 6 or other suitable means of connecting piping (not shown) to vent the volume of gases away from the vessel area when required. The two flanges 1 and 5 are bolted together by bolts 7, nuts 8 and washers 9. The safety pressure relief device 3 serves as a gasket between the flanges 1 and 5 to provide a sealed connection for the pressure vessel.

Figure 2:
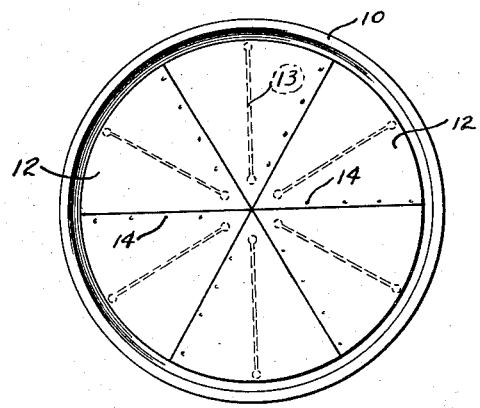
Fig. 2 is a view illustrating the assembly of the protection elements on the concave side of the dome-shaped rupture disc.

The safety presure relief device 3 is composed of a slotted dome-shaped rupture disc 10, a sealing member 11 and a plurality of protection elements 12. The elements 12 are best shown in Fig. 2. They are made from relatively thin material and are positioned between the slotted disc 10 and the sealing member 11 to protect the sealing member 11 from cutting itself on the sharp edges of the slots 13 in the disc 10. The elements 12 are spot welded as shown at 14 on otherwise suitably secured to the disc 10 in covering relationship to the slots 13 in the disc 10. Care must be taken to prevent securing any of the elements 12 to both sides of one of the slots 13. These protection elements 12 have been found helpful in the protection of the sealing member 11 but are not always necessary. Also another possible configuration of a protection member would be to have it in the shape of a poly-leaved rose having a petal in covering relationship to the slots 13 in the disc 10 with only one petal secured to the member 10. These protection members may be of any desired shape or configuration as long as they protect the sealing member 11 from the sharp edges of the slots 13 in the disc 10 and do not present sharp edges themselves causing a possible abrading of the sealing member 11. Also, care should be taken in the design of these protection members so that they do not affect the bursting pressure nor restrict the relief opening when the device has ruptured.

Figure 3:
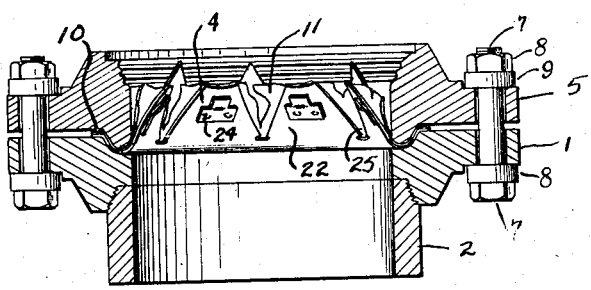
Fig. 3 is a sectional view of a device embodying the principles of the present invention and illustrating it in its ruptured condition.

Fig. 3 illustrates the position of rupture of the device. It should be noted that upon the rupture of the disc 10 the sealing member 11 and the vacuum support 4 all open cooperatively to form a relief opening which has little restriction to the relieving flow for the vessel.

Fig. 4 illustrates the component parts of the preferred form of the present invention. The slotted dome-shaped rupture disc 10 has its dome portion 15 terminating in a reverse curve 16 which flares into an upwardly and outwardly tapered anchoring flange 17. The flat, integral annular peripheral flange 18 shown in Fig. 4 has no other function than to make the disc 10 a little easier to handle and also to provide a surface for the stamping of the pressure rating of the unit.

The slots 13 in the disc 10 extend radially outward from the solid central portion 19. At each end of the slots 13 holes 20 and 21 are drilled or punched to prevent any stress concentrations at the ends of the slots. The holes 21 at the outer end of the slots 13 are positioned in the dome-shaped portion 15 just short of the reversed curve 16.

The device may be constructed to disrupt at a predetermined pressure for any diameter of dome by providing metal of proper thickness, the tensile strength of the metal being considered and providing the dome with slots of proper length. The length of the slots 13 and their proximity at the central portion of the dome will determine the bursting pressure of the unit. For example, the longer the slots, the closer their proximity at the central portion of the dome, the smaller the area will be between the slots to resist the internal pressure of the vessel.

The sealing member 11 is made to conform with the shape of the dome-shaped slotted disc 10 or must be of sufficient flexibility to assume such shape when assembled as a part of this unit. Since the function of the sealing member 11 is simply to prevent leakage through the unit 3 and to prevent corrosion of the disc 10, it may be made from a wide variety of materials. The selection of a material as a sealing member should be made individually for each installation with caution taken to assure the protection of disc 10 from corrosion.

The vacuum support 4 shown with its component members in spaced relationship in Fig. 4 together with the rupture unit 3 is generally used on any installation where it is possible that a pressure differential will be exerted on the convex side of the rupture unit 3. The vacuum support 4 is of a type as shown in the Simpson et al., Patent No. 2,523,068, issued September 19, 1950. Since this device is adequately described in the aforementioned United States Letters Patent additional description here will be omitted except to mention that it is composed of three main elements. These elements as shown in Fig. 3 are a slotted dome-shaped member 22 conforming to the shape of the disc 10, a concave-convex disc 23 and a plurality of clips 24 which are secured to the member 22 to retain the disc 23. The member 22 has slots 25 through which pressure may be transmitted to the sealing member 11. When a vacuum support 4 is used with the safety pressure relief device 3, it is sometimes helpful to utilize an additional set of protection elements 26 which protect the sealing member 11 from cutting on the sharp edges of the slots 25 in the vacuum member 22.

In operation, the individual elements of the safety pressure relief device 3 and the vacuum support 4 are assembled between two flanges as previously described. The pressure on the equipment to be protected operates on the concave side of the sealing member 11 through the slots 25 in the dome-shaped member 22. When properly assembled, the sealing member 11 nests in the concave side of the slotted dome-shaped rupture disc 10 so that the pressure transmitted to the sealing member 11 may be exerted by the sealing member 11 against the concave side of the dome-shaped rupture disc 10. The advantage of the present invention is gained by having a weak section, the convex portion of the rupture disc 10, which controls the bursting pressure of the unit but keeping the remainder of the rupture member strong so that even at pressures approaching the rupture pressure of the unit there will not be any appreciable increase in crown height. This result is desirable to prevent any movement of the rupture unit away from the vacuum support. The reason for this small increase in crown height may be explained as resulting from a stronger rupture member in which stresses are below the yield strength of the material except at the weakened sections. Thus at pressures which would normally result in stresses above the yield strength in an ordinary rupture unit, the same pressures will only cause a minute yield in the weakened section. The same reasoning is responsible for the increased life under conditions which would normally cause a creep failure. Only the weakened section would be stressed enough to creep and such creep would not appreciably increase the crown height.

Care should be taken in the forming of the rupture disc so that the time lag present in previous devices as previously discussed will be minimized. This is accomplished by pre-bulging the rupture disc to a crown height approaching crown height at rupture. The effect of this pre-bulging is to cold work the rupture disc thereby limiting the yielding of the disc when rupture pressures are reached, thus substantially cutting down on the time lag.

The present invention operates well when subjected to corrosive conditions since the sealing member 11 may be made of a material which is impervious to such conditions, thus protecting the slotted dome-shaped member which determines the bursting pressure from any corrosion.

What I claim and desire to secure by Letters Patent is:

1. A safety pressure device comprising a dome-shaped rupture member having slots radiating outwardly from a solid central portion and terminating in spaced relation to the periphery of said rupture member, a dome-shaped sealing member, and means positioning said members in a pressure relieving area whereby the convex side of said sealing member is within and supported by the concave side of said rupture member.

2. Invention according to claim 1, including a plurality of protection elements said elements being positioned between said rupture member and said sealing member in covering relationship to said slots in said rupture member to protect said sealing member from premature failure due to abrasion and cutting of said sealing member on the edges of said slots of said rupture member.

3. Invention according to claim 1, wherein said dome-shaped rupture member is pre-bulged to have a known height less than its normal unslotted crown height at rupture to provide a substantially lower rupture pressure than that which would be obtained with normal crown height.

4. A safety pressure device comprising a dome-shaped rupture member having a plurality of apertures located in spaced relationship around the central portion of said member and a slot radiating from each aperture, said slots terminating at a position spaced from the periphery of said rupture member, a dome-shaped sealing member, and means positioning said members in a pressure relieving area whereby the convex side of said sealing member is within and supported by the concave side of said rupture member.

5. A safety pressure device comprising a rupture member having a plurality of slots radiating outwardly from a solid central portion and terminating in spaced relation to the periphery of said rupture member, a rupturable, corrosion-resistant sealing member, said members being positioned with respect to each other so that said rupture member protects said sealing member from premature rupture and said sealing member provides a seal for the device and also protects the pressure side of said rupture member from corrosion and, a protection member positioned between said rupture member and said sealing member in covering relationship to said slots to protect said sealing member from premature failure due to abrasion and cutting on the edges of said slots of said rupture member.

6. A safety pressure relief device comprising a rupture member having a predetermined structural weakness adapted to rupture at a predetermined pressure, a corrosion resistant seal, said seal having an upper and a lower surface, said upper surface of said seal contacting the under surface of said rupture member, a first protection member positioned between said rupture member and said corrosion resistant seal, a slotted support having its upper surface in contact with the under surface of said seal, whereby said seal is held against substantial movement at all pressures less than said predetermined pressure, said seal and said support being rupturable at pressures not greater than said predetermined pressure, and a second protection member positioned between said seal and said support in covering relation to the slots in said support, said protection members protecting said seal from premature failure due to abrasion and cutting on said rupture member and said slotted support.

7. A safety pressure relief device comprising a rupture member having a plurality of slots radiating outwardly from a solid central portion and terminating in spaced relation to the periphery of said rupture member, a rupturable sealing member, said members being positioned with respect to each other so that said rupture member protects said sealing member from premature rupture and said sealing member provides a seal for the device and a plurality of protection members positioned between said rupture member and said sealing member in covering relationship to said slots to protect said sealing member from premature failure due to abrasion and cutting on the edges of said slots of said rupture member, each of said protection members being secured to said rupture member along one edge of the slot which said member covers.

8. A safety pressure device comprising a dome-shaped rupture member having openings defining lines of predetermined structural weakness radiating outwardly from a solid central portion and terminating in spaced relation to the periphery of said rupture member, a dome-shaped sealing member, and means positioning said members in a pressure relieving area whereby the convex side of said sealing member is within and supported by the concave side of said rupture member.

9. A safety pressure device comprising a dome-shaped rupture member having slots extending generally outward from a solid central portion and terminating in spaced relation to the periphery of said rupture member, a dome-shaped sealing member, and means positioning said members in a pressure relieving area whereby the convex side of said sealing member is within and supported by the concave side of said rupture member.

References Cited in the file of this patent

UNITED STATES PATENTS

| | | |
|---|---|---|
| 138,171 | Matthews | Apr. 22, 1873 |
| 328,008 | Conner et al. | Oct. 13, 1885 |
| 2,123,662 | Raymond | July 12, 1938 |
| 2,523,068 | Simpson et al. | Sept. 19, 1950 |
| 2,548,744 | Simms | Apr. 10, 1951 |
| 2,656,950 | Coffman | Oct. 27, 1953 |
| 2,758,749 | Jones | Aug. 14, 1956 |

UNITED STATES PATENT OFFICE
CERTIFICATION OF CORRECTION

Patent No. 2,953,279                                      September 20, 1960

Robert S. Coffman

It is hereby certified that error appears in the above numbered patent requiring correction and that the said Letters Patent should read as corrected below.

Column 4, line 63, for "known" read -- crown --.

Signed and sealed this 25th day of April 1961.

(SEAL)
Attest:

ERNEST W. SWIDER
Attesting Officer

DAVID L. LADD
Commissioner of Patents